United States Patent
Kotaka et al.

(10) Patent No.: US 8,328,704 B2
(45) Date of Patent: Dec. 11, 2012

(54) ROLLER, APPARATUS FOR MOLDING ROLLER, MOLD FOR FORMING ROLLER, METHOD FOR PRODUCING ROLLER, AND RECORDING APPARATUS

(75) Inventors: Toshikazu Kotaka, Shiojiri (JP); Naohiro Ueyama, Matsumoto (JP); Yasuo Motohashi, Suginami-ku (JP); Satoru Watanabe, Shiojiri (JP); Seiichi Maruyama, Shiojiri (JP); Shoichi Horiuchi, Matsumoto (JP); Mayumi Kinoshita, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 1297 days.

(21) Appl. No.: 11/840,802

(22) Filed: Aug. 17, 2007

(65) Prior Publication Data
US 2008/0044206 A1 Feb. 21, 2008

(30) Foreign Application Priority Data
Aug. 18, 2006 (JP) .................................. 2006-223359

(51) Int. Cl.
B25F 5/02 (2006.01)
B28B 5/00 (2006.01)
(52) U.S. Cl. ......................................... 492/49; 264/250
(58) Field of Classification Search .............. 492/49–56; 249/87; 264/250
See application file for complete search history.

(56) References Cited

U.S. PATENT DOCUMENTS

| | | | | |
|---|---|---|---|---|
| 2,724,864 A * | 11/1955 | Krotz | .............. | 264/276 |
| 3,523,991 A * | 8/1970 | Tucker | ........... | 264/163 |
| 3,646,652 A * | 3/1972 | Heiligenthal et al. | .......... | 492/53 |
| 3,785,217 A * | 1/1974 | Peura | ........... | 474/190 |
| 4,288,058 A * | 9/1981 | Inman | ........... | 249/134 |
| 4,780,746 A * | 10/1988 | Naramore et al. | ............ | 271/274 |
| 4,856,158 A * | 8/1989 | Lindroos et al. | ................ | 492/20 |
| 5,728,343 A * | 3/1998 | Ueno | ............ | 264/275 |
| 5,853,832 A * | 12/1998 | Ishikawa | ........... | 428/36.2 |
| 5,914,742 A * | 6/1999 | Weidert | ........... | 347/153 |
| 6,059,095 A * | 5/2000 | Tsuji | ........... | 198/780 |
| 6,311,615 B1 * | 11/2001 | Hilliard | ........... | 101/212 |
| 6,444,065 B1 * | 9/2002 | Reil et al. | ........... | 156/86 |
| 6,684,042 B2 * | 1/2004 | Nagamori et al. | ............ | 399/176 |

FOREIGN PATENT DOCUMENTS

| | | |
|---|---|---|
| JP | 03-003842 | 1/1991 |
| JP | 08-085646 | 4/1996 |
| JP | 09-124179 | 5/1997 |
| JP | 11-286348 | 10/1999 |
| JP | 11-314789 | 11/1999 |
| JP | 2001-097593 | 4/2001 |
| JP | 2005-162396 | 6/2005 |
| JP | 2005-165026 | 6/2005 |

* cited by examiner

Primary Examiner — David Bryant
Assistant Examiner — Jacob Cigna
(74) Attorney, Agent, or Firm — Workman Nydegger

(57) ABSTRACT

A roller for transporting a recording medium includes an inner layer having a shaft hole through which a rotating shaft passes; and an outer layer formed outside the inner layer and brought into contact with the recording medium. At least a first end surface of the inner layer in a direction along the rotating shaft is located inside the outer layer remote from end surfaces of the outer layer in the direction along the rotating shaft.

2 Claims, 8 Drawing Sheets

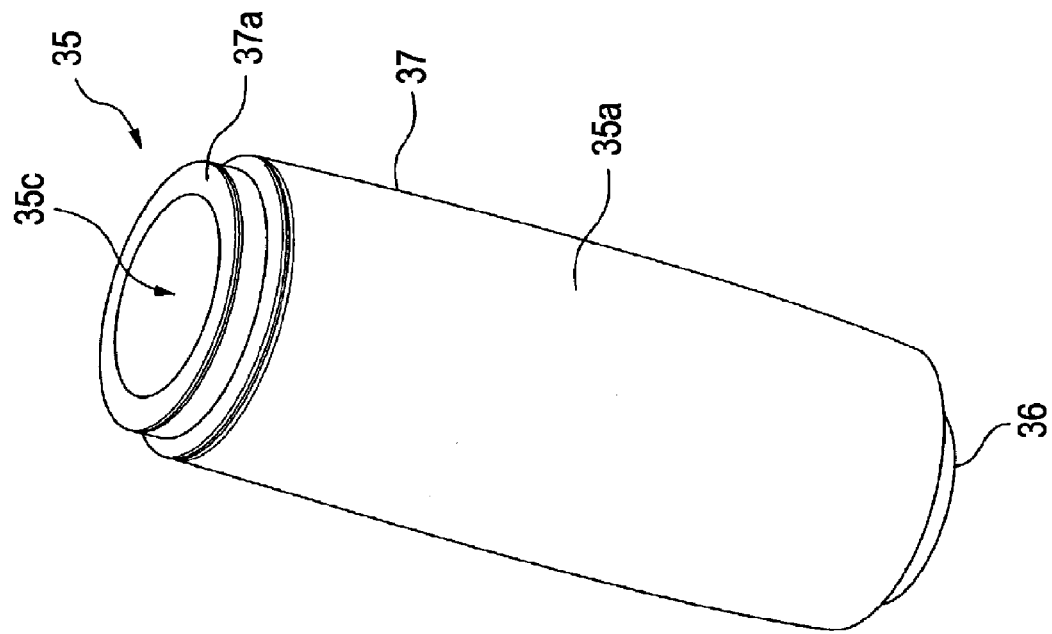
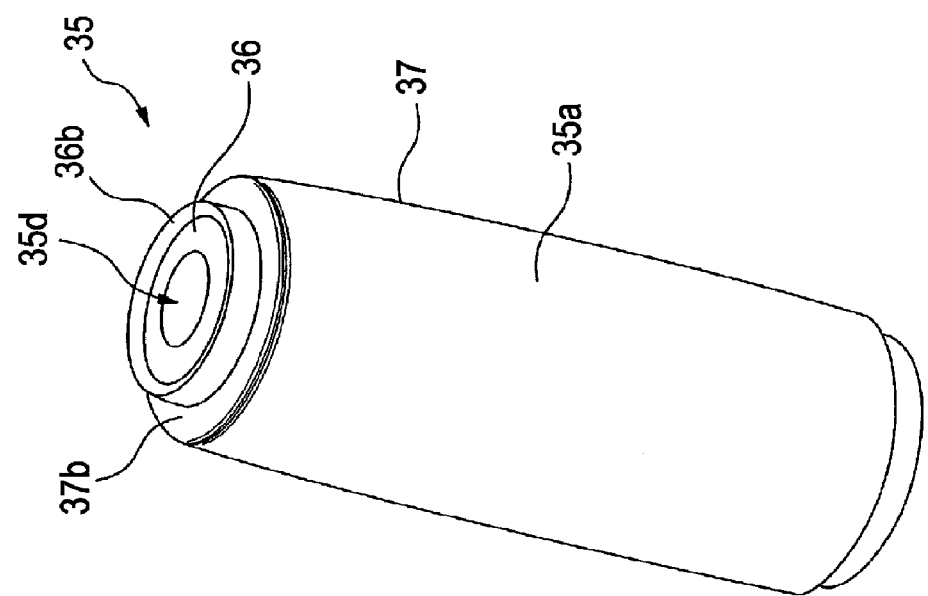

ROLLER, APPARATUS FOR MOLDING ROLLER, MOLD FOR FORMING ROLLER, METHOD FOR PRODUCING ROLLER, AND RECORDING APPARATUS

BACKGROUND

1. Technical Field

The present invention relates to rollers disposed on transporting paths of recording media in recording apparatuses typified by facsimiles, printers, and the like, and relates to recording apparatuses and liquid ejecting apparatuses including the rollers. Moreover, the invention relates to apparatuses for molding the rollers, molds for forming the rollers, and methods for producing the rollers.

2. Related Art

Herein, an ink jet printer will be described as an example of a recording apparatus. An ink jet printer usually includes a transporting unit for transporting recording sheets, serving as an example of recording media, upstream of an ink jet recording head. The transporting unit includes a driving roller and driven rollers pressed into contact with the driving roller so as to be rotated in response to the rotation of the driving roller. When the driving roller is rotated while a recording sheet is pinched between the driving roller and the driven rollers, the recording sheets are transported to an area opposing the ink jet recording head. JP-A-11-286348, JP-A-11-314789, and JP-A-2001-97593, for example, disclose driven rollers pressed into contact with a driving roller so as to be rotated in response to the rotation of the driving roller.

Since the driven rollers are firmly pressed into contact with the recording surface of the recording sheet, roller traces can remain on the recording surface when burrs or the like exist on the outer circumferential surfaces of the rollers. In particular, ends (edges) of the driven rollers in an axial direction can be easily sharpened, and burrs can also be easily created on the outer circumferential surface of the driven rollers. Therefore, the external diameter of the driven roller described in JP-A-2001-97593 at the central portion thereof in the axial direction is increased as compared with those at either end thereof such that both ends of the driven roller in the axial direction, which can be easily sharpened, are prevented from coming into contact with recording sheets.

As shown in FIG. 3 in JP-A-2001-97593, a mold for forming driven rollers has mold gates at first end surfaces of the rollers in a direction along a rotating shaft (hereinafter simply referred to as "first end surfaces of the rollers"). The mold gates are located at the first end surfaces of the rollers since gate bosses (protrusions) remain on the outer circumferential surfaces of the rollers and can damage the recording surfaces of the recording sheets if the mold gates are located at the outer circumferential surfaces of the rollers.

However, when the mold gates are located at the first end surfaces of the rollers, the gate bosses are formed on the first end surfaces, and increase sliding loads between the driven rollers and regulating members for regulating the positions of the driven rollers in the direction along the rotating shaft. This disadvantageously prevents smooth rotation of the rollers. Moreover, in order to solve this problem, a secondary process such as grinding is sometimes required to remove the gate bosses.

In addition, the ends of the outer circumferential surfaces of the rollers can protrude outward (in radial directions) even when the mold gates are located at the first end surfaces of the rollers since a high pressure is applied to resin adjacent to the mold gates. As a result, the ends of the outer circumferential surfaces of the rollers can be firmly pressed into contact with the recording surfaces of the recording sheets, and can damage the recording surfaces.

SUMMARY

An advantage of some aspects of the invention is that a roller causing substantially no damage to a recording surface of a recording sheet is provided such that protrusions formed when high pressure is applied to resin are prevented from being formed at ends on the outer circumferential surface of the roller while gate bosses are prevented from being formed both on the outer circumferential surface and the end surfaces of the roller.

According to a first aspect of the invention, a roller for transporting a recording medium includes an inner layer having a shaft hole through which a rotating shaft passes; and an outer layer formed outside the inner layer and brought into contact with the recording medium. At least a first end surface of the inner layer in a direction along the rotating shaft is located inside the outer layer remote from end surfaces of the outer layer in the direction along the rotating shaft.

According to this aspect, at least the first end surface of the inner layer in the direction along the rotating shaft is located inside the outer layer remote from the end surfaces of the outer layer in the direction along the rotating shaft in the roller having a two-layer structure including the inner layer and the outer layer. With this, even when a mold gate for molding the inner layer using resin is disposed at the first end surface of the inner layer in the direction along the rotating shaft, a gate boss remaining on the inner layer is located inside the outer layer, and is not located on end surfaces of the roller. Moreover, since a mold gate for molding the outer layer using resin can be disposed inside the outer layer, a gate boss remaining on the outer layer is also located inside the outer layer. Thus, the gate bosses are not located either on the outer circumferential surface of the roller or on the end surfaces of the roller.

Therefore, the recording surface of the recording medium is not damaged, and at the same time, sliding load during the rotation of the roller is not increased due to the absence of the gate bosses. Moreover, since the mold gates are located adjacent to the central portion of the roller in the direction along the rotating shaft, high pressure is not applied to resin adjacent to the ends of the roller in the direction along the rotating shaft. This prevents the formation of outward protrusions on the ends of the outer circumferential surface of the roller in the direction along the rotating shaft by the pressure applied to the resin, and prevents damage to the recording surface of the recording medium.

According to a second aspect of the invention, which is dependent on the first aspect, the rotating shaft is in contact with the inner circumferential surface of the shaft hole at a portion corresponding to a central portion of the outer circumferential surface of the roller excluding both end portions in the direction along the rotating shaft. With this, when the roller is brought into elastic contact with the recording medium by applying a load to the rotating shaft, the end portions of the outer circumferential surface of the roller in the direction along the rotating shaft are not pressed into contact with the recording medium, or the contact pressure is small even when the end portions are pressed into contact with the recording medium. That is, the end portions of the outer circumferential surface of the roller in the direction along the rotating shaft, the end portions easily damaging the recording medium, are not pressed into contact with the recording medium, or the contact pressure is small even when the end portions are pressed into contact with the recording medium. Thus, the recording medium is not damaged, and degradation of recording quality can be prevented.

According to a third aspect of the invention, an apparatus for molding a roller for transporting a recording medium, the roller including an inner layer having a shaft hole through which a rotating shaft passes and an outer layer formed outside the inner layer and brought into contact with the recording medium, at least a first end surface of the inner layer in a direction along the rotating shaft being located inside the outer layer remote from end surfaces of the outer layer in the direction along the rotating shaft, the inner layer being formed during molding of a first-color component and the outer layer being formed during molding of a second-color component, includes a first mold gate for forming the inner layer located at a position of the first end surface of the inner layer to be formed in the direction along the rotating shaft, the first end surface to be located inside the outer layer; and a second mold gate for forming the outer layer located inside the outer layer to be formed. According to this aspect, no gate bosses are formed either on the outer circumferential surface of the roller or on the end surfaces of the roller. Thus, effects similar to those in the first aspect can be produced.

According to a fourth aspect of the invention, which is dependent on the third aspect, the second mold gate is located at a position opposing the first end surface of the inner layer to be formed in the direction along the rotating shaft, and resin ejected from the second mold gate first flows in radial directions of the roller, and subsequently flows in the direction along the rotating shaft.

With this, high pressure is not applied to resin adjacent to the ends of the outer circumferential surface of the roller in the direction along the rotating shaft, and formation of outward protrusions on the ends of the outer circumferential surface of the roller in the direction along the rotating shaft by the pressure applied to the resin can be prevented more reliably.

According to a fifth aspect of the invention, a method for producing a roller for transporting a recording medium using two-color molding, the roller including an inner layer having a shaft hole through which a rotating shaft passes and an outer layer formed outside the inner layer and brought into contact with the recording medium, includes forming the inner layer using a first mold having a first mold gate located at a position of a first end surface of the inner layer to be formed in a direction along the rotating shaft during molding of a first-color component; and forming the outer layer using a second mold having a second mold gate located at a position opposing the first end surface of the inner layer in the direction along the rotating shaft during molding of a second-color component, the first end surface of the inner layer being located inside the outer layer to be formed remote from end surfaces of the outer layer in the direction along the rotating shaft. According to this aspect, both a gate boss remaining on the inner layer and that remaining on the outer layer are not located either on the outer circumferential surface of the roller or on the end surfaces of the roller. Thus, effects similar to those in the first aspect can be produced.

According to a sixth aspect of the invention, a recording apparatus includes a recording unit capable of recording on a recording medium; a driving roller disposed upstream of the recording unit; and the roller according to the first aspect brought into elastic contact with the driving roller so as to be rotated in response to the rotation of the driving roller. According to this aspect, effects similar to those in the first and second aspects can be produced in the recording apparatus.

BRIEF DESCRIPTION OF THE DRAWINGS

The invention will be described with reference to the accompanying drawings, wherein like numbers reference like elements.

FIGS. 3A and 3B are perspective views of a driven roller for transporting.

DESCRIPTION OF EXEMPLARY EMBODIMENTS

Figure 1:
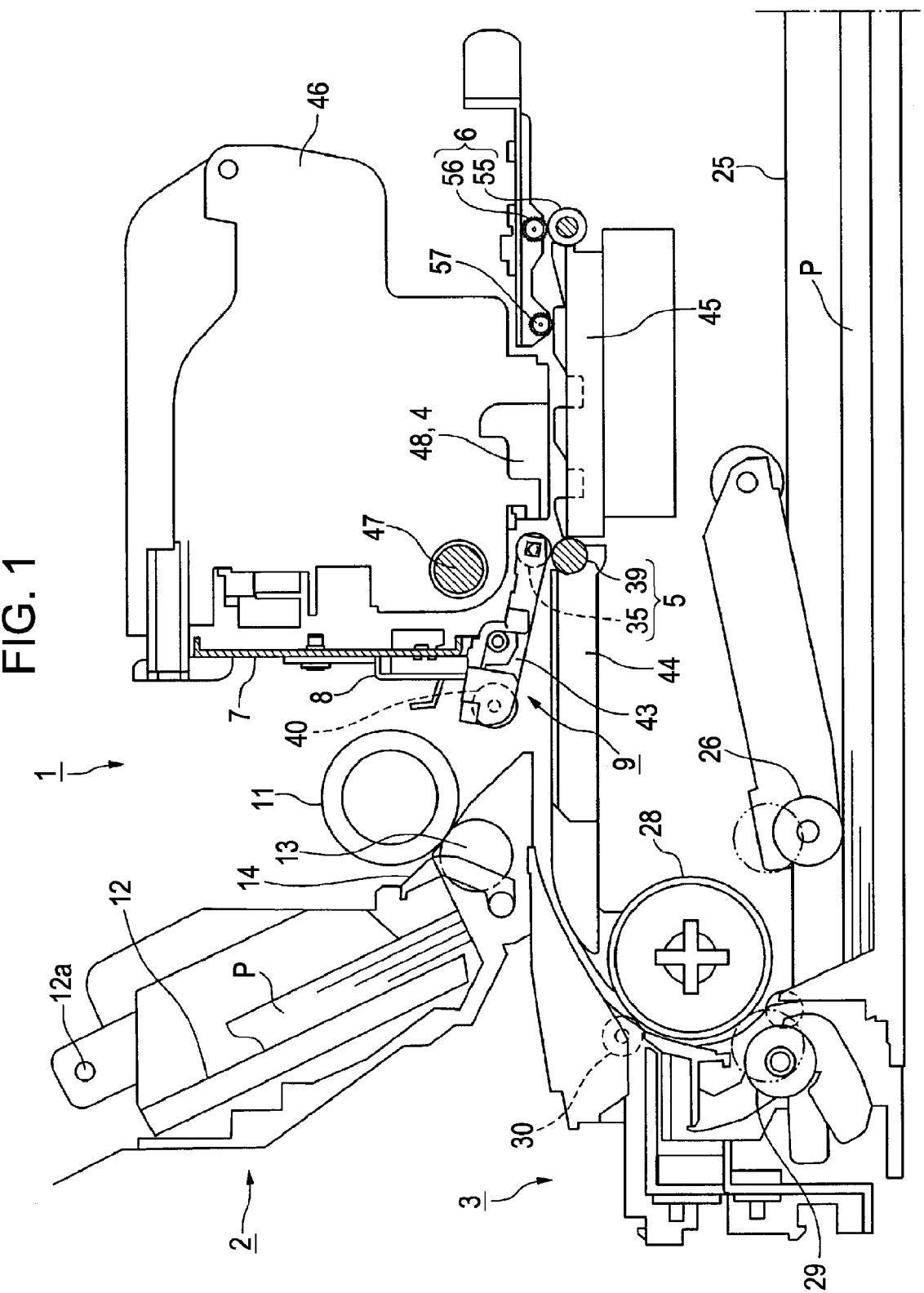
FIG. 1 is a cross-sectional view of a printer according to an embodiment of the invention.

An embodiment of the invention will now be described with reference to FIGS. 1 to 8.

The overall structure of an ink jet printer (hereinafter referred to as a "printer") 1 serving as an embodiment of a "recording apparatus" or a "liquid ejecting apparatus" according to the invention will now be described with reference to FIG. 1. The printer 1 includes a rear feeding device 2 disposed at the rear of the apparatus and a front feeding device 3 disposed at the bottom of the apparatus. Recording sheets serving as "recording media" or "media to which liquid is ejected" are fed from these two feeding devices to a transporting unit 5. The recording sheets are transported to a recording unit 4 (recording head 48) by the transporting unit 5, and discharged to a stacker (not shown) by a discharging unit 6 after recording.

Components on a sheet-transporting path will now be described in detail. The rear feeding device 2 includes a hopper 12, a feeding roller 11, a retard roller 13, a return lever 14, and other components that are not shown. The hopper 12 is formed of a plate, and is disposed so as to be pivotable on a supporting point 12a in the upper portion of the apparatus. When the hopper 12 is pivoted, the position of sheets P obliquely supported on the hopper 12 is switched between a contact position in which the sheets P are pressed into contact with the feeding roller 11 and a separate position in which the sheets P are separated from the feeding roller 11.

The feeding roller 11 is cylindrical, and feeds the top sheet P downstream thereof by rotating while being pressed into contact with the top sheet P. The outer circumference of the retard roller 13 is composed of an elastic material. The retard roller 13 can be pressed into contact with the feeding roller 11, and a predetermined rotational resistance is applied to the retard roller 13 using a torque limiting mechanism. With this, double feeding of the sheets is prevented by pinching the sheets P between the feeding roller 11 and the retard roller 13. The return lever 14 returns the leading ends of the sheets remaining between the feeding roller 11 and the retard roller 13 (sheets to be doubly fed under the top sheet) onto the hopper 12.

On the other hand, the front feeding device 3 disposed at the bottom of the printer 1 and allowing users to load sheets from the front of the apparatus includes a feeding cassette 25 loadable from the front of the apparatus, a pick-up roller 26, a feeding roller 28, a separation roller 29, and an assist roller 30. The pick-up roller 26 is rotated by a motor (not shown), and the top sheet P is fed from the feeding cassette 25 when the pick-up roller 26 is rotated while being in contact with the top sheet P in the feeding cassette 25. The feeding roller 28 is rotated by a motor (not shown), and curves and reverses the top sheet P fed from the feeding cassette 25 so as to feed the sheet P to a driving roller 39 for transporting via a rear sheet guide 44.

The separation roller 29 is disposed at a position opposing the outer circumferential surface of the feeding roller 28 so as to be in contact with or be separated from the feeding roller 28. When the top sheet P is fed from the feeding cassette 25, the separation roller 29 is pressed into contact with the feeding roller 28 so as to form a nip. The leading ends of the sheets P under the top sheet P fed together with the top sheet P from the feeding cassette 25 can be retained in the vicinity of the nip. The assist roller 30 is disposed so as to be in contact with the outer circumferential surface of the feeding roller 28. The assist roller 30 assists the feed of the sheet P in connection with the rotation of the feeding roller 28 by nipping the sheet P between the feeding roller 28 and the assist roller 30.

The rear sheet guide 44 and an upper sheet-guide unit 9 for guiding the sheet P to the transporting unit 5 are disposed downstream of the rear feeding device 2 and the front feeding device 3. The sheet P fed from the rear feeding device 2 or the front feeding device 3 is guided to the transporting unit 5 by the upper sheet-guide unit 9 and the rear sheet guide 44. A guide roller 40 adjusts the feeding position of the sheet P fed from the rear feeding device 2.

The transporting unit 5 includes the driving roller 39 rotated by a motor and driven rollers 35 for transporting, serving as an embodiment of a "roller" according to the invention, journaled in an upper sheet guide 43 and pressed into contact with the driving roller 39 so as to be rotated in response to the rotation of the driving roller 39. The driving roller 39 includes a metallic shaft extending in a width direction of sheets and a layer formed on the outer circumferential surface of the metallic shaft. Abrasion-resistant particles are substantially uniformly dispersed in the layer. The outer circumferential surface of the driven rollers 35 are composed of a low-friction material such as polyacetal resin. The driven rollers 35 are disposed in an axial direction of the driving roller 39.

Figure 2:
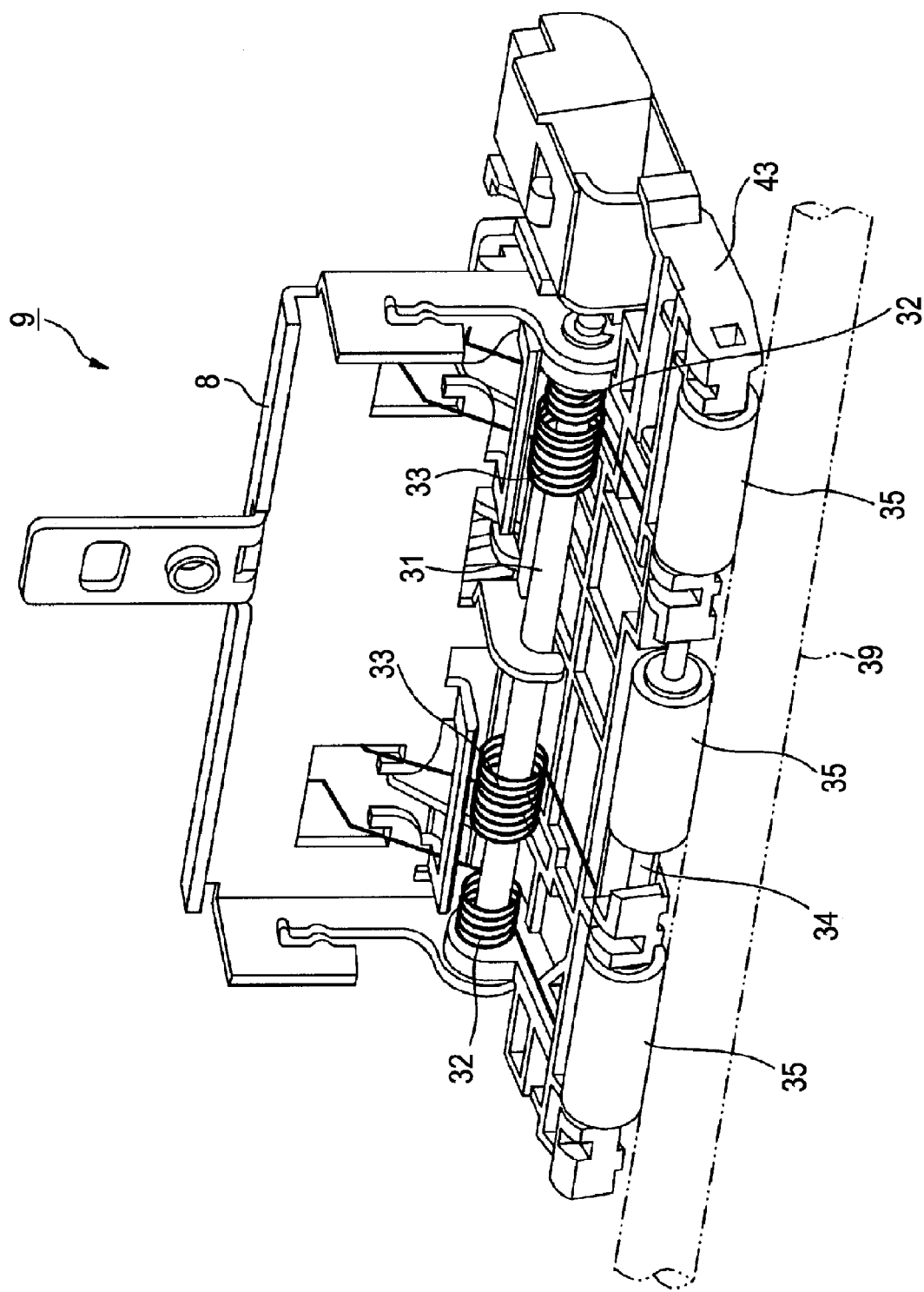
FIG. 2 is a perspective view of an upper sheet-guide unit.

As shown in FIG. 2, the upper sheet-guide unit 9 for supporting the driven rollers 35 includes a sub-frame 8, the upper sheet guide 43, a shaft 31, two first coil springs 32, two second coil springs 33, a rotating shaft 34, and three driven rollers 35. These components are assembled so as to form the upper sheet-guide unit 9.

The upper sheet guide 43 is pivotable on the sub-frame 8 via the shaft 31. When this sub-frame 8 is attached to a main frame 7, the upper sheet guide 43 can be pivoted on the main frame 7 when the sheet-transporting path is viewed from the side. The shaft 31 passes through coil portions of the coil springs 32 and 33. The biasing force of the first coil springs 32 operates between the sub-frame 8 and the upper sheet guide 43, and the biasing force of the second coil springs 33 operates between the sub-frame 8 and the rotating shaft 34. These biasing forces bring the driven rollers 35 into elastic contact with the driving roller 39.

In FIG. 1, the sheet P that has reached the transporting unit 5 is transported to the downstream recording unit 4 (recording head 48) by the rotation of the driving roller 39 while being nipped between the driving roller 39 and the driven rollers 35. The recording head 48 is disposed at the bottom of a carriage 46. The carriage 46 is reciprocated by a driving motor (not shown) in a main scanning direction (direction perpendicular to the side view shown in FIG. 1) while being guided by a carriage-guiding shaft 47 extending in the main scanning direction. Moreover, the carriage 46 has independent color ink cartridges (not shown) installed therein. Ink is supplied from these ink cartridges to the recording head 48.

A front sheet guide 45 that supports the sheet P from the bottom thereof is disposed at a position opposing the recording head 48. The front sheet guide 45 defines a gap between the sheet P and the recording head 48. An auxiliary roller 57 that prevents the sheet P from being lifted from the front sheet guide 45 and the discharging unit 6 that discharges the sheet P on which a recording is made are disposed downstream of the recording unit 4. The discharging unit 6 includes a driving roller 55 for discharging rotated by a motor (not shown) and driven rollers 56 for discharging being in contact with the driving roller 55 so as to be rotated in response to the rotation of the driving roller 55. The sheet P on which a recording has been made using the recording unit 4 is discharged to the stacker (not shown) disposed in the front of the apparatus by the rotation of the driving roller 55 while being nipped between the driving roller 55 and the driven rollers 56.

Figure 4:
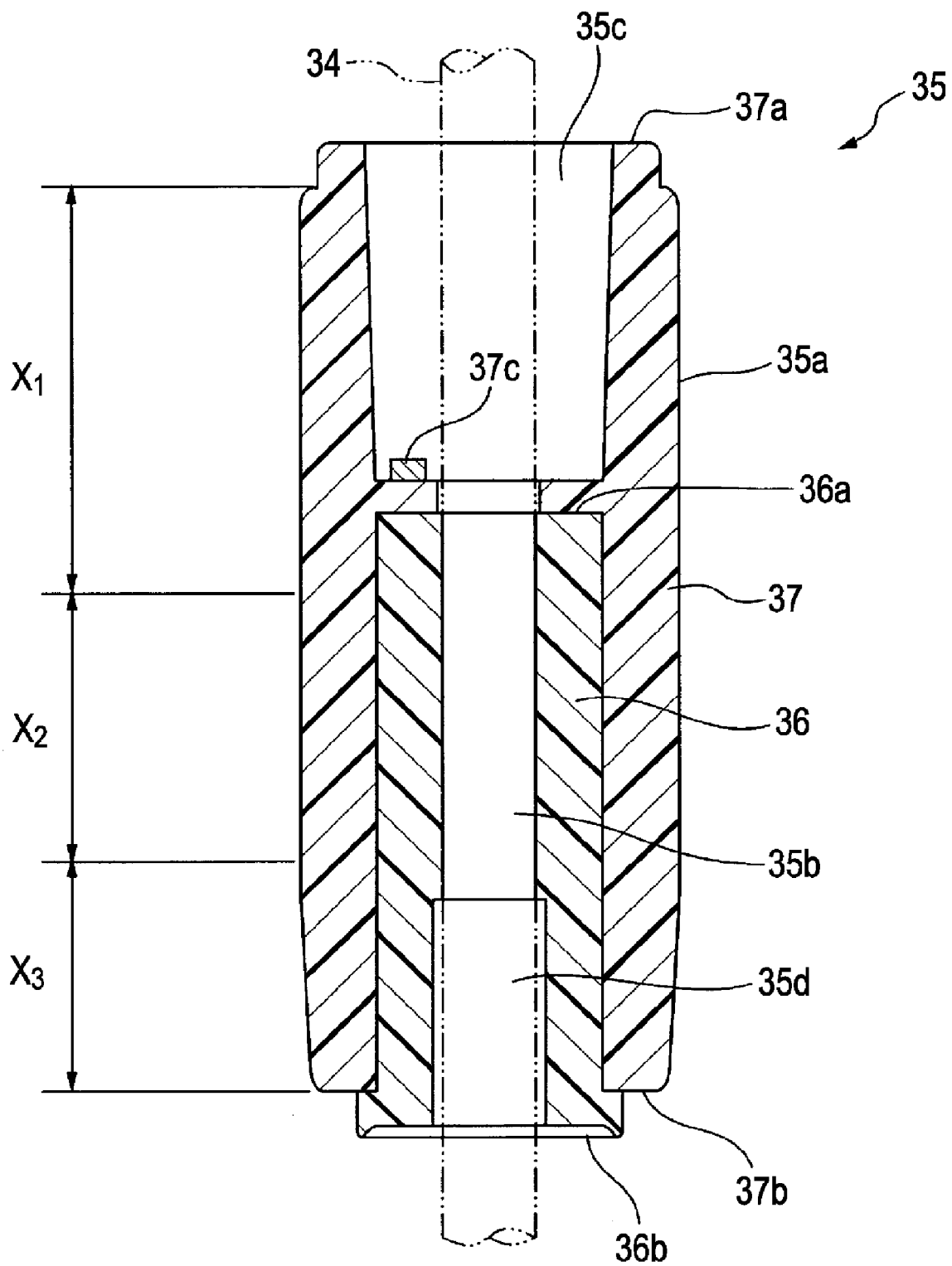
FIG. 4 is a cross-sectional view of the driven roller cut by a plane parallel to a direction along a rotating shaft.

Next, the structure of the driven rollers 35, a method for producing the driven rollers 35, and the structure of molds for forming the driven rollers 35 will be described in detail with reference to FIGS. 3A to 8. As shown in FIGS. 3A, 3B, and 4, each of the driven rollers 35 includes an inner layer 36 in which a shaft hole 35$b$ is formed and an outer layer 37 formed outside the inner layer 36 and brought into contact with a sheet. The rotating shaft 34 passes through the shaft hole 35$b$.

The outer circumferential surface 35$a$ of the driven roller 35 (outer circumferential surface of the outer layer 37) includes a straight portion $X_2$ parallel to the rotating shaft and oblique portions $X_1$ and $X_3$ disposed at either end of the straight portion $X_2$ and having diameters being reduced toward the roller ends. Since the driven roller 35 is removed from the mold upward in FIG. 4 (described in detail below), the inclination of the oblique portion $X_1$ is smaller than that of the oblique portion $X_3$.

At least one of the end surfaces of the inner layer 36 in the direction along the rotating shaft (end surface indicated by a reference number 36$a$) is located inside the outer layer 37. In other words, a recessed portion 35$c$ is formed inside the outer layer 37 since the end surface 36$a$ of the inner layer 36 is located inside the outer layer 37 remote from an end surface 37$a$ of the outer layer 37. Thus, transfer of the end surface 37$a$ of the outer layer 37 shown in an upper portion of FIG. 4 and an end surface 36$b$ of the inner layer 36 shown in a lower portion of FIG. 4 in the direction along the rotating shaft is regulated by the upper sheet guide 43 (shown in FIG. 2).

Moreover, a large-diameter portion 35$d$ having a diameter larger than that of the shaft hole 35$b$ is formed in the inner layer 36 adjacent to the end surface 36$b$ that is opposite to the end surface 36$a$ located inside the outer layer 37. Thus, when the driven roller 35 is supported by the upper sheet guide 43 and urged toward the driving roller 39, clearances are created around the rotating shaft 34 passing through the shaft hole 35$b$ at either end portion of the driven roller 35 in the direction along the rotating shaft. With this structure, the rotating shaft 34 is in contact with the inner circumferential surface of the shaft hole 35$b$ at a portion corresponding to the central portion of the outer circumferential surface 35$a$ of the roller excluding both end portions in the direction along the rotating shaft. Accordingly, the end portions of the outer circumferential surface 35$a$ of the roller in the direction along the rotating shaft can be prevented from being pressed into contact with (being obliquely brought into contact with) the recording surface of a sheet, and damage to the recording surface of the sheet caused when the end portions of the outer circumferential surface 35a of the roller in the direction along the rotating shaft are brought into contact with the recording surface of the sheet can be prevented more reliably.

In addition, the external diameter of the roller can be increased while an increase in thickness of each layer is regulated since the driven roller 35 includes a plurality of layers (two in this embodiment). That is, degradation of geometric properties (circularity, cylindricity, circumferential runout, and the like) of the driven roller 35 as a molded component can be regulated by regulating an increase in thickness of each layer. With this, variations in the rotational resistance (loss at the shaft) during the rotation of the driven roller in response to the rotation of the driving roller can be regulated, and degradation of sheet transportation accuracy can be prevented.

Furthermore, since the external diameter of the roller can be increased while the geometric properties of the molded component are maintained satisfactorily, the rotational resistance during the rotation of the driven roller in response to the rotation of the driving roller can be reduced, and the driven roller is prevented from slipping on sheets. At the same time, the occurrence of a kicking phenomenon that can occur when the trailing end of a sheet passes through a nip formed between the driving roller 39 and the driven roller 35 can be reduced.

The driven roller 35 having the above-described structure can be formed by, for example, two-color molding in which the inner layer 36 is formed using a first color material and the outer layer 37 is formed using a second color material (described in detail below). The inner layer 36 and the outer layer 37 can be composed of, for example, polyacetal resin (POM). In particular, when the frictional coefficient of the inner layer 36 after molding is lower than that of the outer layer 37, resistance caused by friction between the rotating shaft 34 and the inner layer 36 (loss at the shaft) can be reduced, and sheets can be transported more smoothly. Satisfactory results were obtained using, for example, LZ750 of Asahi Kasei Chemicals Corporation make as the material of the inner layer 36.

When the hardness of the outer circumferential surface of the outer layer 37 is extremely high, the contact area between the recording surface of a sheet and the outer layer 37 becomes extremely small. As a result, strip-shaped roller traces (surface imprints) can be easily formed. Therefore, it is desirable that the hardness of the outer circumferential surface of the outer layer 37 be reduced to a minimum. Satisfactory results were obtained using, for example, SX-35 of Polyplastics Co., Ltd. make as the material of the outer layer 37.

Figure 5:
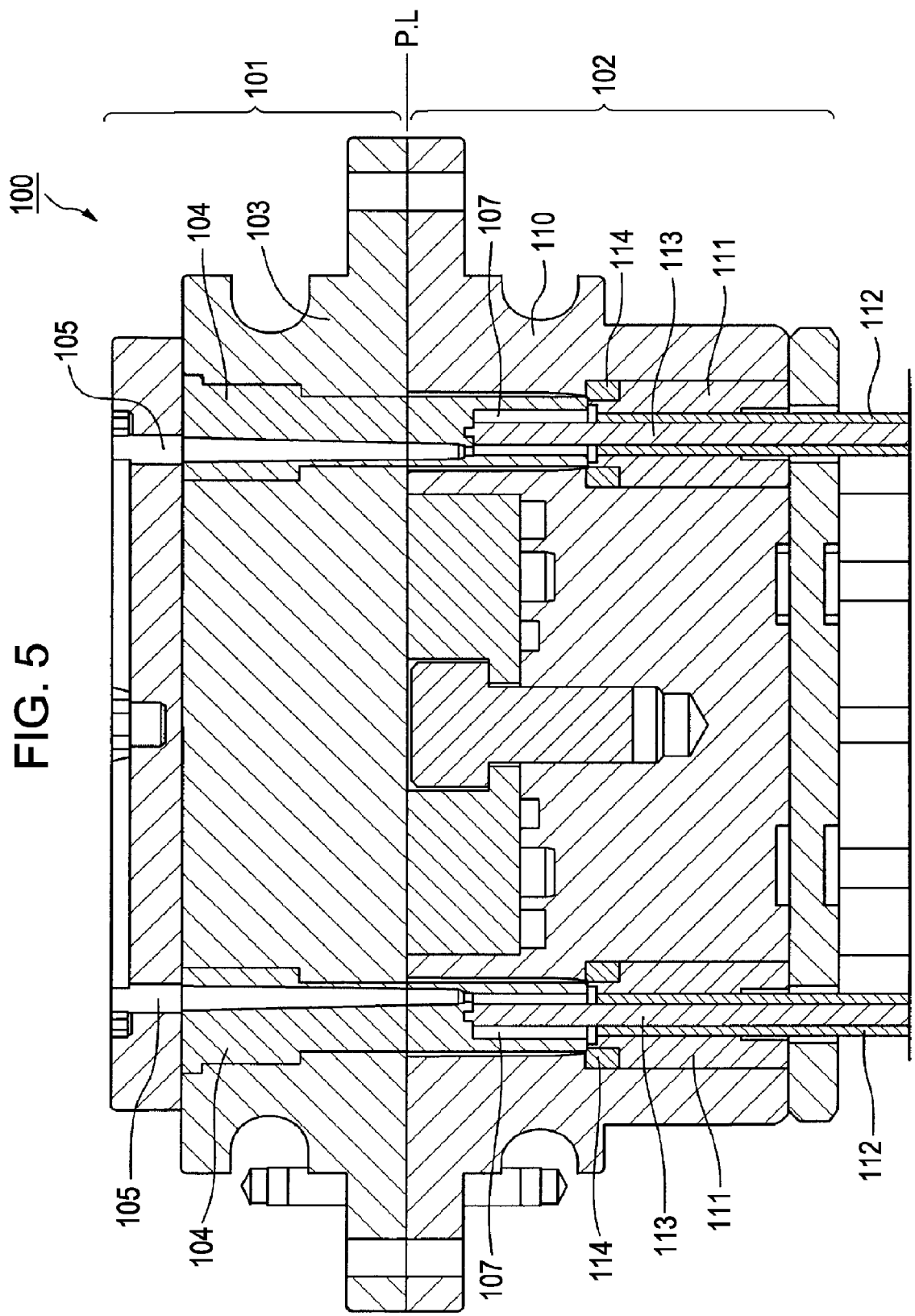
FIG. 5 is a cross-sectional view of a mold assembly for forming first color components.
Figure 6:
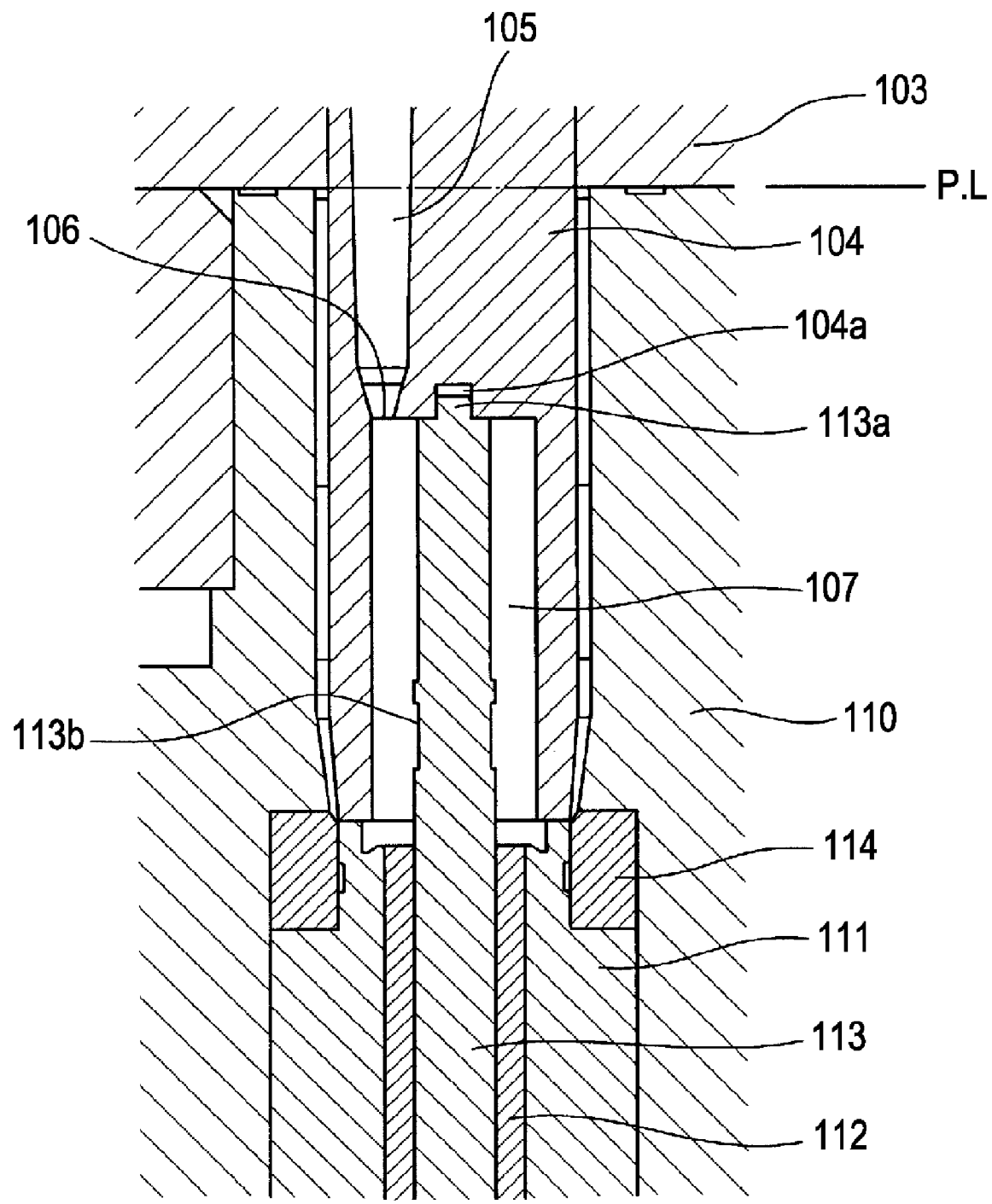
FIG. 6 is a partially enlarged view of FIG. 5.
Figure 7:
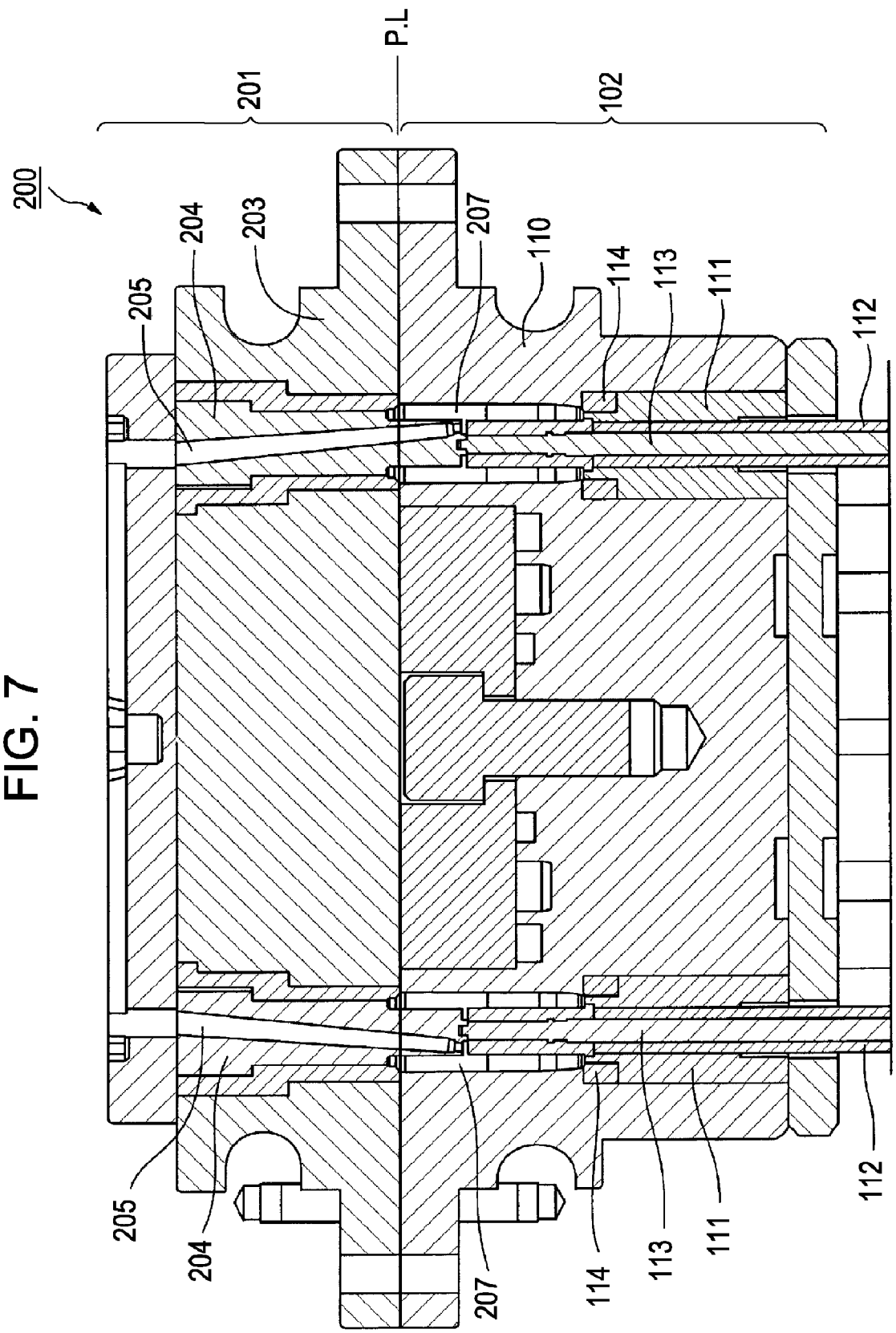
FIG. 7 is a cross-sectional view of a mold assembly for forming second color components.
Figure 8:
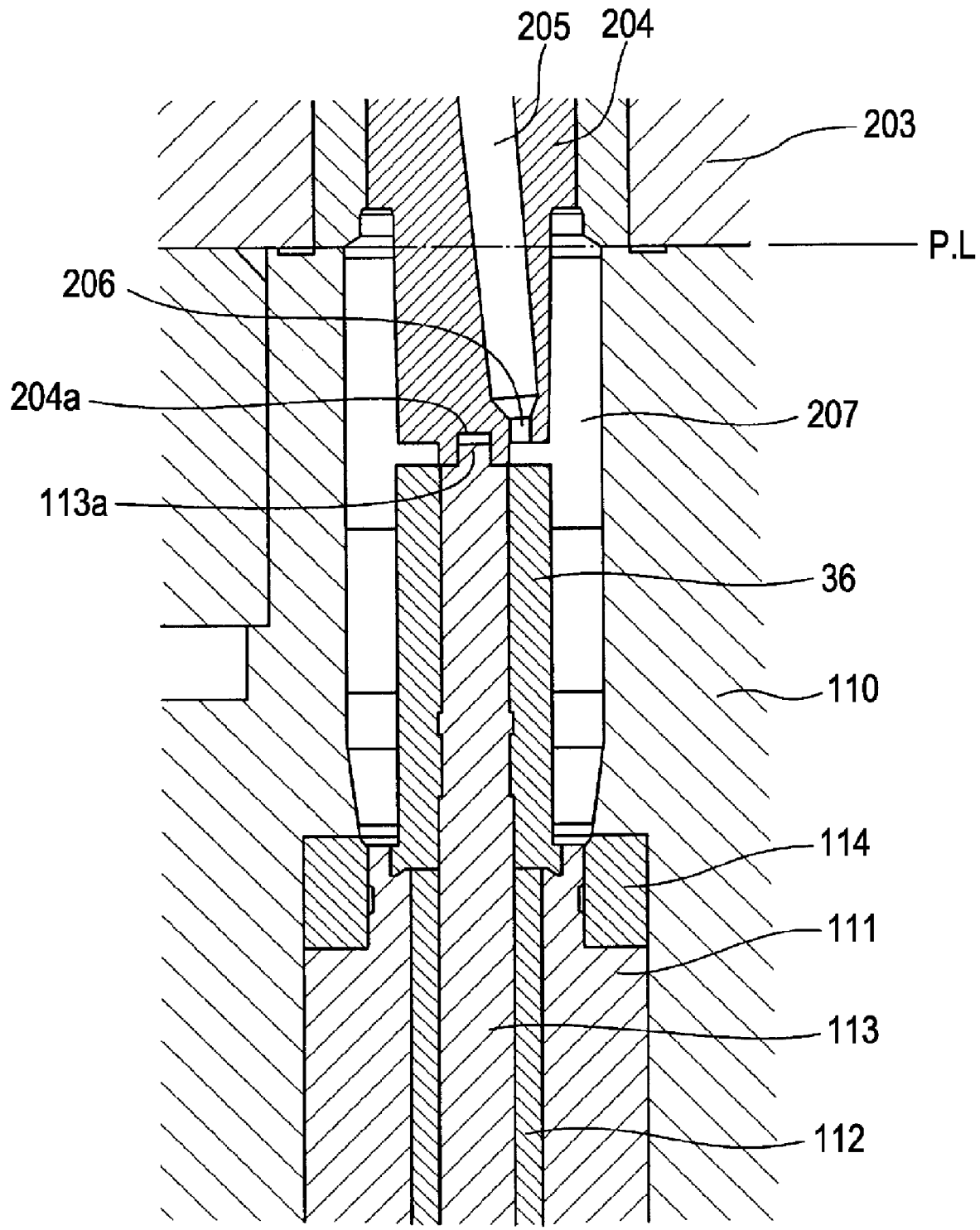
FIG. 8 is a partially enlarged view of FIG. 7.

Next, the structure of molds for forming the driven rollers 35 having the above-described structure will be described. The molds shown in FIGS. 5 to 8 are used in an injection molding apparatus (not shown) capable of two-color molding. A mold assembly 100 shown in FIG. 5 is used for molding first-color components (primary molding), and a mold assembly 200 shown in FIG. 7 is used for molding second-color components (secondary molding).

The mold assembly 100 includes a fixed upper mold (cavity) 101 and a movable lower mold (core) 102. The lower mold 102 can be separated from the upper mold 101, and can be rotated so as to oppose a fixed upper mold 201 for molding second-color components as shown in FIG. 7. During molding of second-color components, the upper mold 201 and the lower mold 102 constitute the mold assembly 200.

The mold assemblies 100 and 200 are substantially circular when viewed in plan. The mold assembly 100 has a plurality of (for example, twelve) cavities 107 for molding the inner layers 36 of the driven rollers 35 in the circumferential direction thereof. Similarly, the mold assembly 200 has a plurality of (for example, twelve) cavities 207 for molding the outer layers 37 of the driven rollers 35 in the circumferential direction thereof.

The lower mold 102 includes a mold base 110 and slidable sleeves 112. In addition, a center pin 113 passes through each of the sleeves 112 so as to be slidable. Protruding portions 113a each formed at the top of the corresponding center pin 113 are engaged with recessed portions 104a each formed in a mold block 104 such that the cavities 107 are accurately partitioned. Each of the center pins 113 has an undercut portion 113b for preventing the inner layers 36 from being removed together with the upper mold 101 during unmolding. Nests of blocks 111 and 114, the blocks 114 located in upper portions of the blocks 111, can vent gas generated during molding in a downward direction.

The upper mold 101 includes a mold base 103, and the mold blocks 104 are engaged with the mold base 103. The mold blocks 104 each have a loading path 105 for loading molten resin and a gate 106 for ejecting the resin. The gates 106 are formed at positions where the end surfaces 36a of the inner layers 36 are formed. The loading paths 105 extend directly toward the corresponding gates 106 in a substantially vertical direction.

On the other hand, the upper mold 201 used for molding second-color components includes a mold base 203, and mold blocks 204 are engaged with the mold base 203. The mold blocks 204 each have a loading path 205 for loading molten resin and a gate 206 for ejecting the resin. The loading paths 205 extend toward the corresponding gates 206 so as to be slightly inclined with respect to the vertical direction. The gates 206 are formed at positions opposing the end surfaces 36a of the inner layers 36 such that molten resin first flows in radial directions of the rotating shaft, and then flows in the direction along the rotating shaft.

With the molds having the above-described structure, first-color components are first formed using the mold assembly 100. After the inner layers 36 are formed, the lower mold 102 is separated from the upper mold 101, and rotated to a position under the upper mold 201 so as to form the mold assembly 200. Subsequently, second-color components are formed using the mold assembly 200. After the outer layers 37 are formed, the lower mold 102 is separated from the upper mold 201, and the sleeves 112 are pushed upward. With this, the molded components are separated from the center pins 113, and can be taken out of the lower mold 102 upward.

The driven roller 35 and the molds having the above-described structure can produce the following effects. That is, since the end surface 36a of the inner layer 36 is located inside the outer layer 37 to be formed remote from the end surface 37a of the outer layer 37, the gate 106 for forming the inner layer 36 can be located inside the outer layer 37 remote from the end surface 37a of the outer layer 37 as shown in FIG. 6. Therefore, a gate boss, if formed, is not located on the end surfaces of the driven roller 35. In this embodiment, the gate boss formed during forming of the inner layer 36 is covered with the molten resin of the outer layer 37.

Similarly, a gate boss formed during forming of the outer layer 37, which is indicated by a reference number 37c shown in FIG. 4, can be located inside the outer layer 37 since the gate 206 for forming the outer layer 37 is located inside the outer layer 37. Thus, no gate bosses are formed on the outer circumferential surface of the driven roller 35 or on the end surfaces of the roller.

Therefore, the recording surface of a sheet is not damaged by the outer circumferential surface 35a of the roller, and at the same time, the sliding load between the driven roller and the upper sheet guide 43 during the rotation of the roller is not increased due to the absence of the gate bosses. Moreover, since the gates 106 and 206 are located adjacent to the central portion of the driven roller 35 in the direction along the rotating shaft instead of the ends of the roller, high pressure is not applied to resin adjacent to the ends of the driven roller 35 in the direction along the rotating shaft. This prevents the formation of outward protrusions on the ends of the outer circumferential surface 35a of the roller in the direction along the rotating shaft by the pressure applied to the resin, and prevents damage to the recording surface of the sheet.

The structures of the driven roller 35 and the molds described above should be interpreted to be illustrative, and other structures can be adopted as long as the gate boss formed on the inner layer 36 is not located on the end surfaces of the roller, and at the same time, the gate boss formed on the outer layer 37 is not located either on the outer circumferential surface of the roller or on the end surfaces of the roller.

In the above-described embodiments, a roller according to an embodiment of the invention is applied to an ink jet printer serving as an example of a recording apparatus. However, the roller can be applied to general liquid ejecting apparatuses in addition to the recording apparatus. In addition to a recording apparatus such as a printer, a copier, and a facsimile having an ink jet recording head and recording on recording media by ejecting ink from the recording head, the "liquid ejecting apparatus" herein includes an apparatus having a liquid ejecting head corresponding to the ink jet recording head and ejecting liquid for an intended purpose instead of ink from the liquid ejecting head to target media corresponding to the recording media such that the liquid adheres to the target media.

In addition to the recording head, the liquid ejecting head includes heads for ejecting color materials used for manufacturing color filters of liquid-crystal displays and the like; heads for ejecting electrode materials (conductive paste) used for forming electrodes of organic electroluminescent (EL) displays, field emission displays (FEDs), and the like; heads for ejecting bioorganic substances used for manufacturing biochips; heads for ejecting samples serving as precision pipettes; and the like.

What is claimed is:

1. An apparatus for molding a roller for transporting a recording medium, the roller including an inner layer having a shaft hole through which a rotating shaft passes and an outer layer formed outside the inner layer, the inner layer being formed during molding of a first-color component and the outer layer being formed during molding of a second-color component, the roller formed by fitting a lower mold to each of a first upper mold and a second upper mold, the apparatus for molding comprising:

a lower mold;

a first upper mold which forms the inner layer by molding;

a first inner wall surface formed by the first upper mold and the lower mold, the first inner wall surface making a cylindrical cavity for forming the inner layer, wherein the lower mold forms an inner side of the cylindrical cavity for forming the inner layer;

a first gate opened to the first inner wall surface of the first upper mold, the first gate forming an end face of the cylindrical cavity;

a second upper mold which forms the outer layer by molding;

a second inner wall surface formed between the second upper mold and the lower mold, the second inner wall surface making a cavity for forming the outer layer, wherein the lower mold forms an outer side of the cavity for forming the outer layer; and a second gate opened to the second inner wall surface of the second upper mold to form the outer layer, the second gate being positioned at a predetermined distance from an edge of the inner layer wherein the first gate and the second gate are positioned inside the outer layer to be formed.

2. The apparatus for molding the roller according to claim 1, wherein the second mold gate is located at a position opposing an end surface of the inner layer to be formed in the direction along the rotating shaft, and resin ejected from the second mold gate first flows in radial directions of the roller, and subsequently flows in the direction along the rotating shaft.

* * * * *